United States Patent
Brian

[19]

[11] Patent Number: 6,032,860
[45] Date of Patent: Mar. 7, 2000

[54] UNIFORM ULTRAVIOLET STROBE ILLUMINATOR AND METHOD OF USING SAME

[75] Inventor: Steven R. Brian, Bedford, N.H.

[73] Assignee: Ci-Matrix, Canton, Mass.

[21] Appl. No.: 08/906,679

[22] Filed: Aug. 5, 1997

[51] Int. Cl.[7] .................................................. G06K 7/10
[52] U.S. Cl. .............. 235/454; 235/462.31; 235/462.43; 235/462.44; 235/491
[58] Field of Search .................................. 235/454, 468, 235/462.31, 462.41, 462.43, 462.44, 491

[56] References Cited

U.S. PATENT DOCUMENTS

| | | |
|---|---|---|
| 3,582,623 | 6/1971 | Rothery et al. ........................... 235/454 |
| 3,614,430 | 10/1971 | Berler . |
| 3,683,332 | 8/1972 | Steiger et al. . |
| 3,742,833 | 7/1973 | Sewell et al. . |
| 3,744,026 | 7/1973 | Wolff . |
| 3,763,356 | 10/1973 | Berler . |
| 3,810,097 | 5/1974 | Muir et al. . |
| 3,839,630 | 10/1974 | Olander, Jr. et al. . |
| 3,946,203 | 3/1976 | Hecht et al. ............................ 235/454 |
| 4,045,777 | 8/1977 | Mierzwinski et al. . |
| 4,082,943 | 4/1978 | Jensen et al. . |
| 4,160,902 | 7/1979 | Van Wijngaarden .................... 250/461 |
| 4,166,540 | 9/1979 | Marshall . |
| 4,242,730 | 12/1980 | Golias et al. . |
| 4,282,425 | 8/1981 | Chadima, Jr. et a. . |
| 4,408,121 | 10/1983 | Galatha . |
| 4,500,880 | 2/1985 | Gomersall et al. . |
| 4,561,731 | 12/1985 | Kley . |
| 4,680,457 | 7/1987 | Robertson . |
| 4,793,812 | 12/1988 | Sussman et al. . |
| 4,806,776 | 2/1989 | Kley . |
| 4,841,359 | 6/1989 | Hawkins et al. . |
| 4,874,933 | 10/1989 | Sanner ..................................... 235/470 |
| 4,939,354 | 7/1990 | Priddy et al. . |
| 4,957,348 | 9/1990 | May . |
| 4,983,817 | 1/1991 | Dolash et al. . |
| 5,019,699 | 5/1991 | Koenck .................................... 235/472 |
| 5,196,684 | 3/1993 | Lum et al. . |
| 5,233,171 | 8/1993 | Baldwin . |

(List continued on next page.)

OTHER PUBLICATIONS

International Search Report for Application No. PCT/US98/16148.

*Primary Examiner*—Donald Hajec
*Assistant Examiner*—Dougins X. Rodriguez
*Attorney, Agent, or Firm*—Orrick, Herrington & Sutcliffe LLP

[57] ABSTRACT

An apparatus and method for illuminating with ultraviolet light an optically readable code formed with ultraviolet material, preferably an ultraviolet ink or resin. The apparatus includes:

a housing having an interior chamber, an interior wall on one side of the interior chamber, a first side of the chamber facing the ultraviolet material, a second side of the chamber opposite the first side, a first opening and a second opening in the first side, and a third opening in the second side, a passageway having a perimeter surrounded by an outer wall, the passageway extending substantially from the second opening to the third opening, the passageway perimeter defining the interior wall of the chamber, a strobe lamp disposed within the chamber having an ultraviolet light output wherein the passageway perimeter prevents the ultraviolet light generated by the strobe lamp from passing into the passageway, and an ultraviolet bandpass filter covering the first opening of the chamber, but not the passageway, to block substantially all nonultraviolet light generated by the strobe lamp. The apparatus preferably further includes a second filter of a color which matches the color of the ultraviolet material to transmit only light of that color to an image sensor, such as a CCD device, positioned behind the passageway. The method includes illuminating the strobe lamp in response to the activation of a proximity sensor and then reading the code with the image sensor.

28 Claims, 8 Drawing Sheets

U.S. PATENT DOCUMENTS

| | | | |
|---|---|---|---|
| 5,313,373 | 5/1994 | Bjorner et al. | 361/19 |
| 5,324,923 | 6/1994 | Cymbalski et al. | |
| 5,380,992 | 1/1995 | Damen et al. | 235/462 |
| 5,408,263 | 4/1995 | Kikuchi et al. | |
| 5,414,258 | 5/1995 | Liang | |
| 5,446,271 | 8/1995 | Cherry et al. | |
| 5,449,891 | 9/1995 | Giebel | 235/462.31 |
| 5,502,304 | 3/1996 | Berson et al. | 250/271 |
| 5,534,684 | 7/1996 | Danielson | 235/472 |
| 5,554,842 | 9/1996 | Connel et al. | 235/491 |
| 5,585,616 | 12/1996 | Roxby et al. | |
| 5,631,456 | 5/1997 | Kost et al. | 235/462 |
| 5,666,417 | 9/1997 | Liang et al. | 380/23 |
| 5,719,948 | 2/1998 | Liang | 382/112 |
| 5,736,725 | 4/1998 | Danielson | 235/462 |
| 5,773,808 | 6/1998 | Laser .- | |

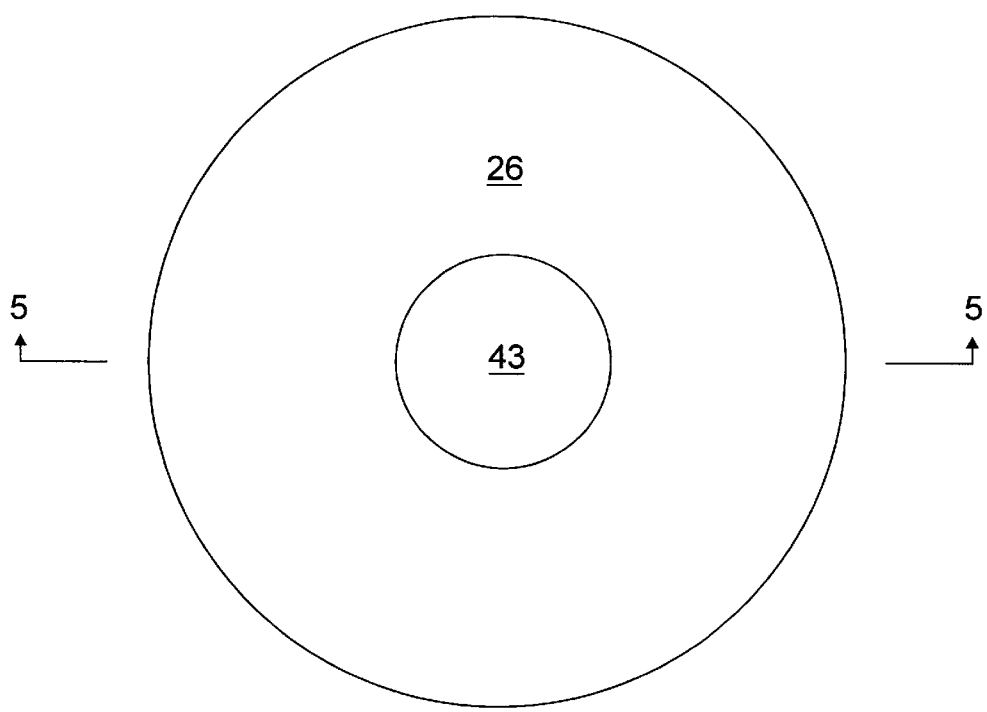
FIG. 5B
FIG. 5A
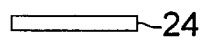
FIG. 6B
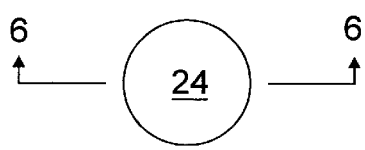
FIG. 6A
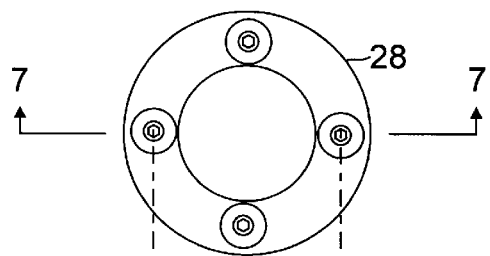
FIG. 7A
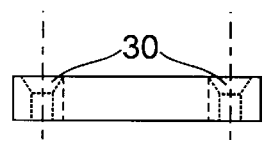
FIG. 7B

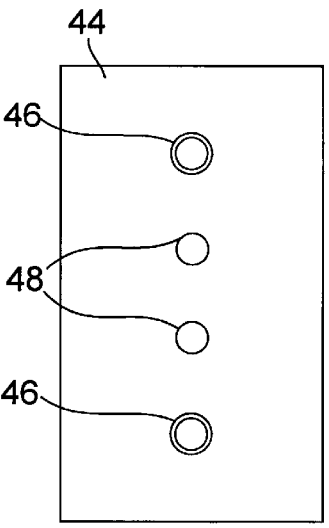 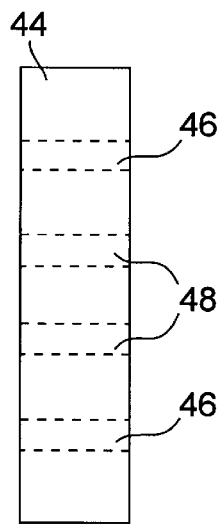
FIG. 10A  FIG. 10B
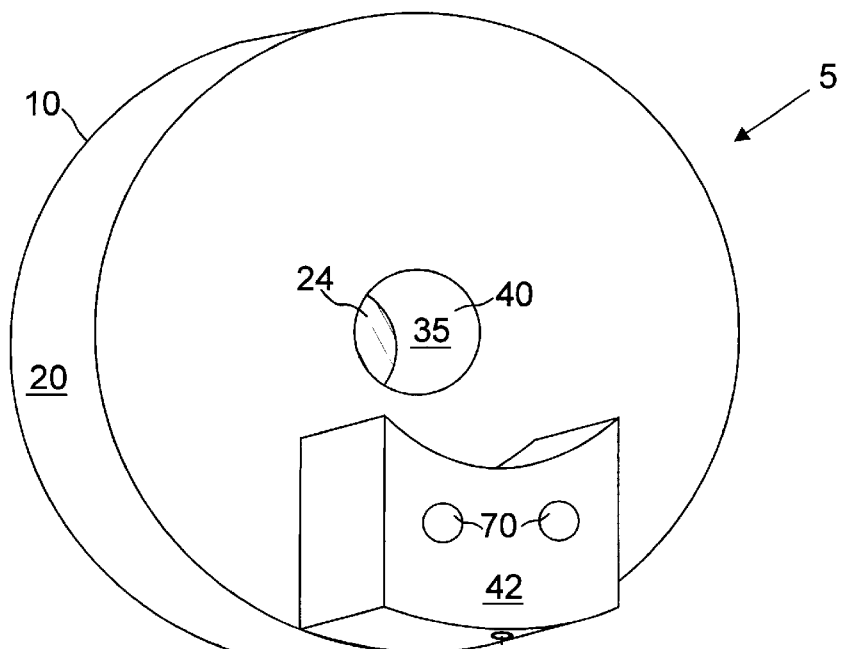
FIG. 9
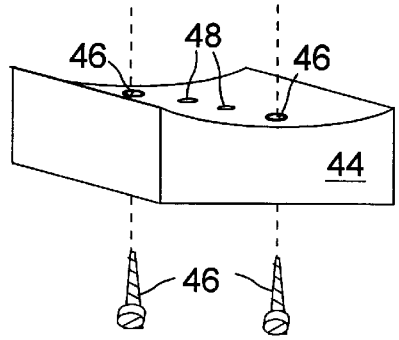

UNIFORM ULTRAVIOLET STROBE ILLUMINATOR AND METHOD OF USING SAME

FIELD OF THE INVENTION

This invention relates to illuminating an optically readable code, more particularly to illuminating a fluorescent optically readable code with intense ultraviolet light, thereby causing the ultraviolet material to fluoresce and become readable by a camera or CCD device.

BACKGROUND OF THE INVENTION

Ultraviolet materials are well-suited for use as inks and resins for printing optically readable codes, such as optical character recognition, bar codes, matrix codes and other one-dimensional and multidimensional symbologies, because an ultraviolet material is excited and fluoresces when ultraviolet light strikes it. The fluorescent light emitted by the ultraviolet material may then be detected, that is photographed or imaged with a camera or CCD device, and the captured information decoded and processed.

Ultraviolet printing materials provide a further benefit that, compared to nonultraviolet printing inks or fluorescent materials, they can be more readily applied directly on a greater variety of substrates, such as glass as in the case of glass vials or test tubes. More particularly, printing ultraviolet optically readable codes directly on a surface eliminates the need to print an optically readable code on a paper label which must then be applied to the substrate.

An especially useful type of binary code is a matrix code as described in detail in U.S. Pat. No. 5,324,923, which is incorporated by reference herein. Matrix codes are more compact and can contain more information than other binary codes (making them especially suitable as identifiers on small test tubes). Matrix codes can also be made very reliable.

To cause the ultraviolet material to fluoresce sufficiently to be read by a nearby camera requires light intense enough to illuminate and facilitate the capture of all of the coded information. Unlike ordinary incandescent lamps, a strobe lamp is known to provide a high intensity flash with a sufficient quantity of ultraviolet light to cause the requisite fluorescence. The fluorescent light emitted by the ultraviolet material may be the same color as the ink in a nonfluorescent state.

A conventional strobe lamp, however, emits an undesirable amount of nonultraviolet light which interferes with the fluorescence of the ultraviolet material. Moreover, the ultraviolet light may also cause other fluorescent materials, which do not contain coded information and which are not the intended target for the fluorescence, to fluoresce and thereby generate additional fluorescent light which interferes with the reading of the optically readable code.

SUMMARY OF THE INVENTION

It is therefore an object of this invention to provide a single device, which works in conjunction with a camera or CCD device, to enable the reading of optically readable codes printed in ultraviolet materials.

It is a further object of this invention to provide a radiant energy source for illuminating ultraviolet material of an optically readable code with sufficiently intense ultraviolet light to cause the ultraviolet material to fluoresce.

It is a further object of this invention to illuminate the ultraviolet material using a strobe lamp.

It is a further object of this invention to filter out nonultraviolet light generated by the strobe lamp before the light impinges on the ultraviolet material.

It is a further object of this invention to provide a means for filtering out undesired fluorescent light emitted from materials near the optically readable code at the time of illumination by the strobe lamp.

It is a further object of this invention to permit high speed reading of optically readable codes, including Vision, optical character recognition (OCR) and one and two-dimensional symbologies like bar and matrix codes.

These objectives are achieved by an apparatus and method according to the present invention for illuminating an ultraviolet material with ultraviolet light. The apparatus comprises a housing having an interior chamber, an interior wall on one side of the interior chamber, a first side of the chamber facing the ultraviolet material, a second side of the chamber opposite the first side, a first opening and a second opening in the first side, and a third opening in the second side, a passageway having a perimeter surrounded by an outer wall, the passageway extending substantially from the second opening to the third opening, the passageway perimeter defining the interior wall of the chamber, a strobe lamp disposed within the chamber having an ultraviolet light output, wherein the passageway perimeter prevents the ultraviolet light generated by the strobe lamp from passing into the passageway, and an ultraviolet bandpass filter covering the first opening of the chamber, but not the passageway, to block substantially all nonultraviolet light generated by the strobe lamp. Preferably, the ultraviolet material comprises an ink or resin of a particular color printed on a substrate as an optically readable code.

In another aspect of this invention, an apparatus for illuminating an ultraviolet optically readable symbol comprises a housing having a light emitting end and a cavity, a strobe light disposed in the housing cavity having an ultraviolet radiation output, a passageway disposed in the housing optically isolated from the strobe light, and a first bandpass filter coupled to the housing so that the strobe light ultraviolet radiation output passes through the first filter and does not pass into the passageway, the first filter having a bandpass frequency range in the ultraviolet range.

The method of reading with the apparatus the optically readable code imprinted on the substrate comprises placing a sensor near the illuminator apparatus and means for reading an image behind the third opening, moving an optically readable code first in front of the sensor to activate the sensor and then moving the code in front of the housing, illuminating the strobe lamp in response to the activation of the sensor, the ultraviolet filter permitting only ultraviolet light to pass through onto the optically readable code, thereby causing the ultraviolet material of the optically readable code to fluoresce and emit light in the first band of wavelengths, and reading the optically readable code with the reading means.

In another aspect of this invention, a method for detecting optically readable codes printed in ultraviolet material comprises detecting a presence of the optically readable code, operating a strobe light to emit ultraviolet radiation in response to a detected code, filtering the emitted ultraviolet radiation to substantially eliminate nonultraviolet radiation, illuminating the optically readable code with the filtered emitted radiation, and detecting light emitted in response to the illumination of the code.

In a preferred embodiment, the strobe lamp is ring-shaped and flashes once in response to the signal from a proximity sensor. Ultraviolet light from the strobe lamp in the range of 230–430 nm passes through the ultraviolet bandpass filter and onto the optically readable code. The ultraviolet light causes the ultraviolet material in the code to fluoresce, emitting light of the same color as the color of the ultraviolet material, and reflect onto a second filter over the "second opening" at the front of the cylindrical passageway which filters light of the same color as the color of the ultraviolet material. Thus, where a blue ultraviolet ink is used, the second filter comprises a bandpass filter passing light between the wavelengths of 350–550 nm. The light travels through the passageway to the "third opening" at the rear of the passageway where the code is read by an image sensing means, such as a camera or CCD device. The apparatus also may comprise a camera stand on which the image sensing means is rested.

BRIEF DESCRIPTION OF THE DRAWINGS

FIG. 5A is a front view of the ultraviolet bandpass filter, the rear view being substantially a mirror image thereof;

FIG. 5B is a cross-sectional view of the ultraviolet filter along line 5—5 of FIG. 5A;

FIG. 6A is a front view of the circular, blue filter mounted to the front of the illuminator, the rear view being substantially a mirror image thereof;

FIG. 6B is a cross-sectional view of the blue filter along line 6—6 of FIG. 6A;

FIG. 7A is a front view of the filter retaining ring;

FIG. 7B is a cross-sectional view of the retaining ring along line 7—7 with screws inserted;

FIG. 9 is a partially exploded, perspective view of the illuminator with strobe mount to be mounted to the bottom of the illuminator;

FIGS. 10A–10B are bottom and side views, respectively, of the strobe mount;

DETAILED DESCRIPTION OF PREFERRED EMBODIMENT

Figure 1:
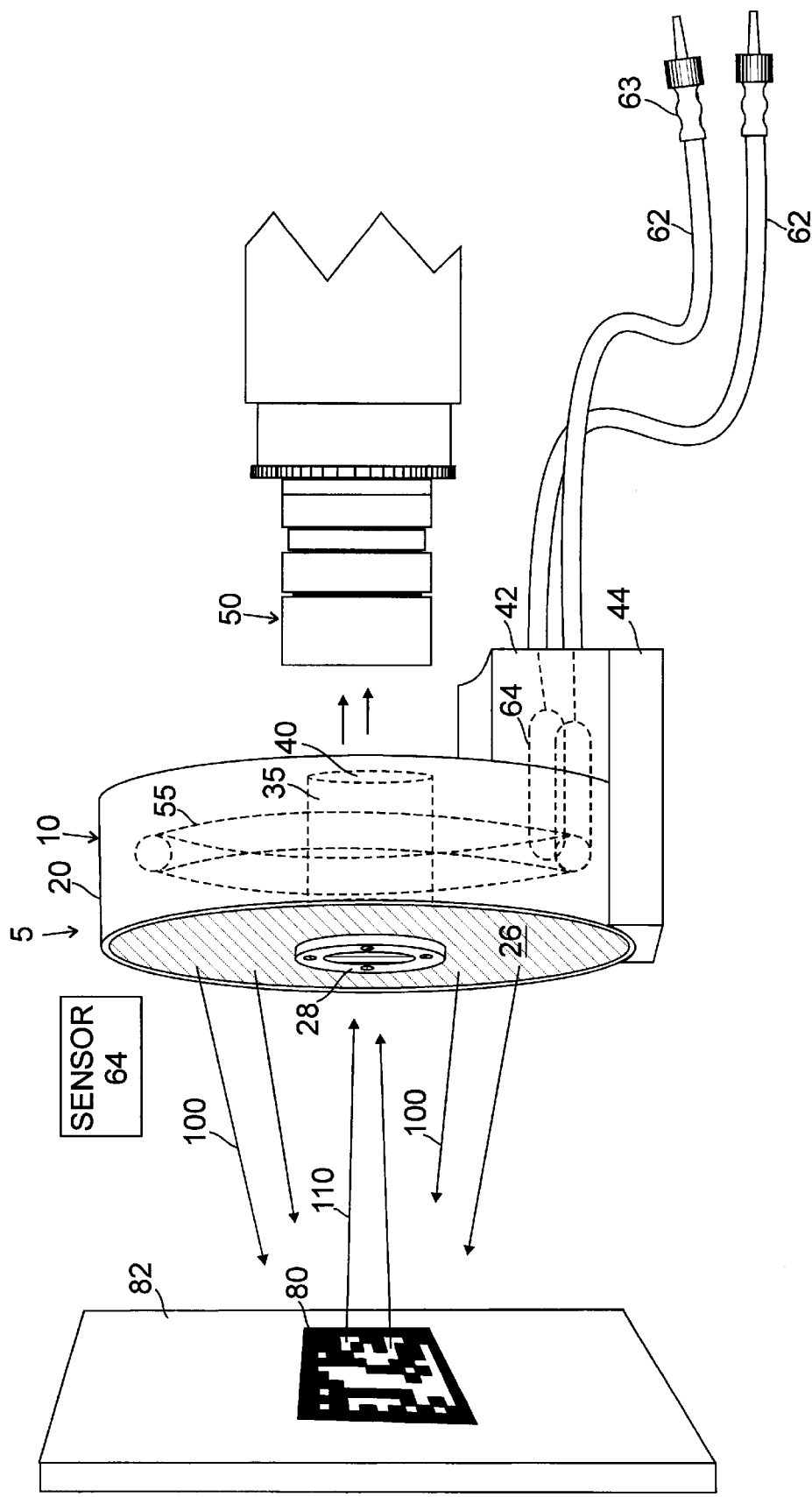
FIG. 1 is a perspective view of a preferred embodiment of the illuminator of the present invention, a camera and an ultraviolet material imprinted in the shape of a matrix code on a surface material.
Figure 2A:
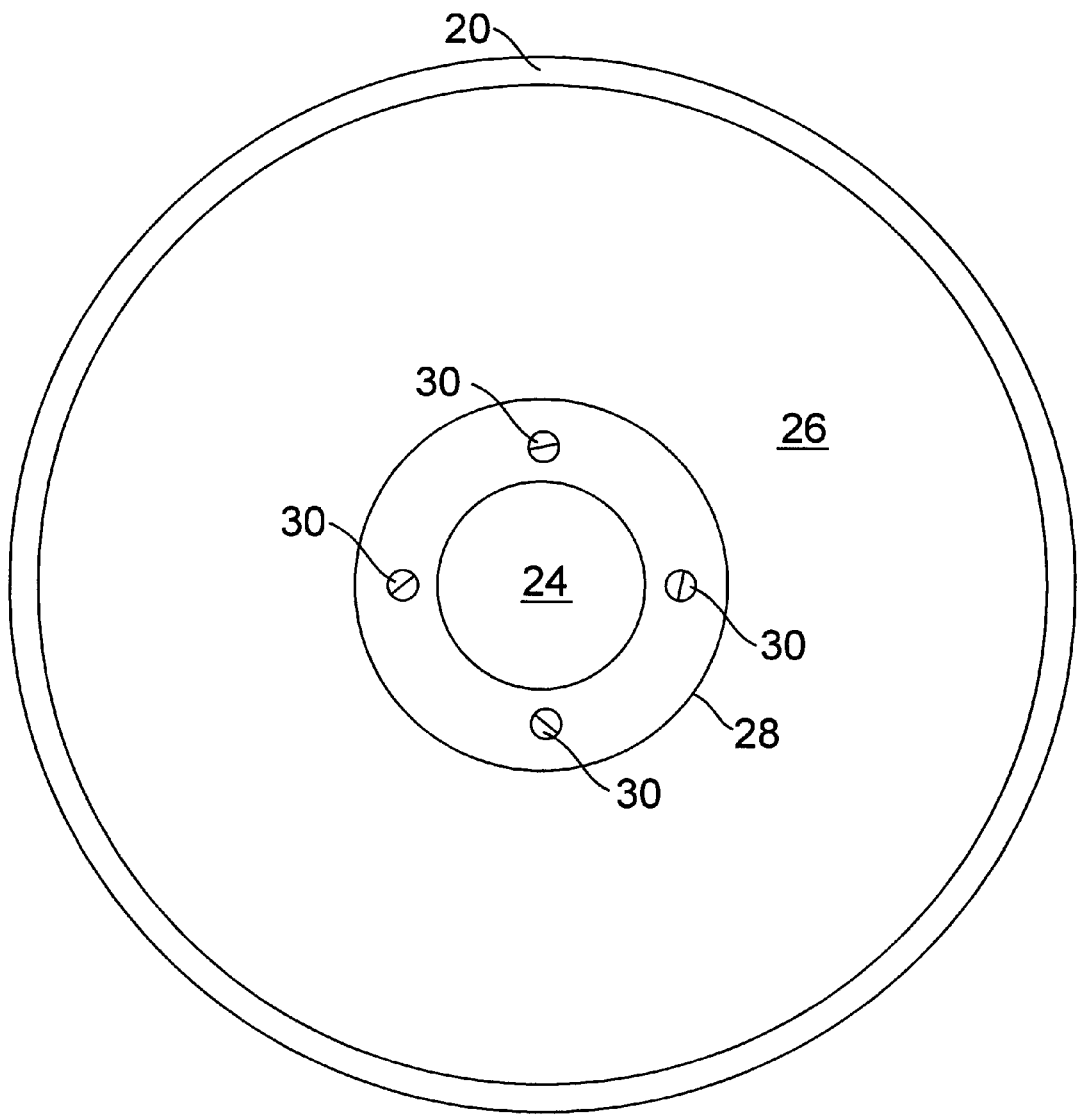
FIG. 2A is a front view of the illuminator of FIG. 1 as assembled with filters and retaining ring.
Figure 2B:
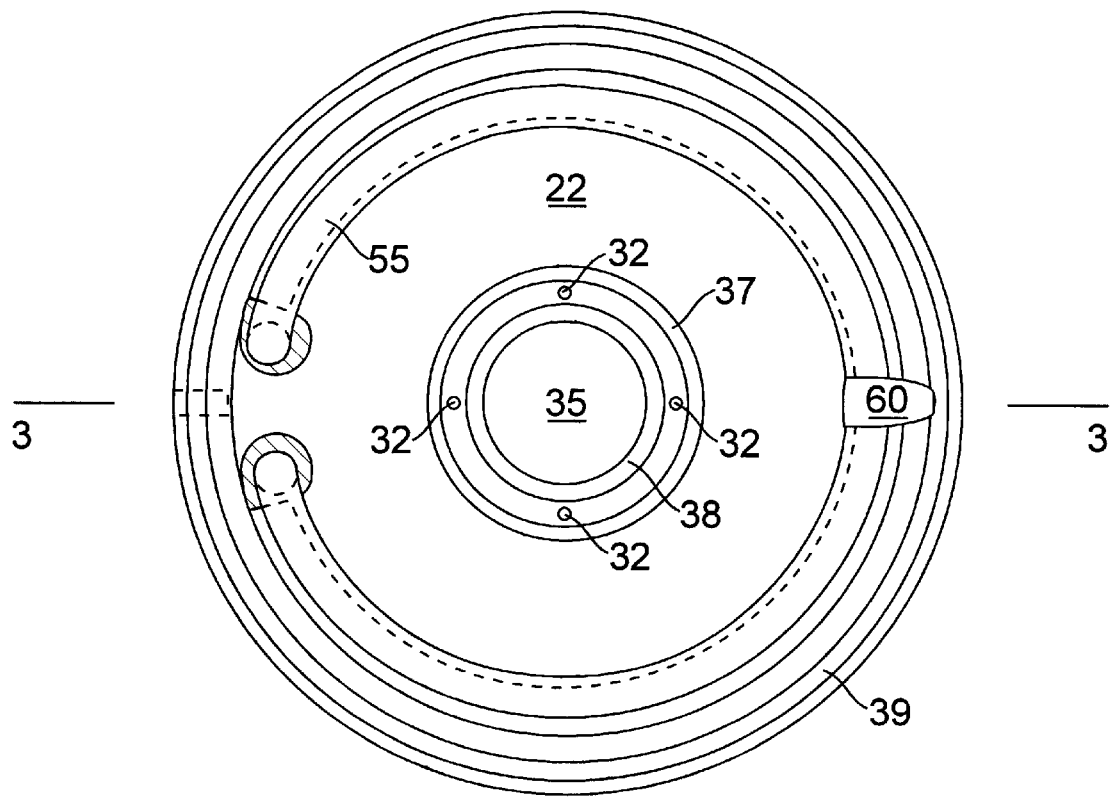
FIG. 2B is a front view of the illuminator of FIG. 1 with the bandpass filters, retaining ring, and strobe mount removed.
Figure 3:
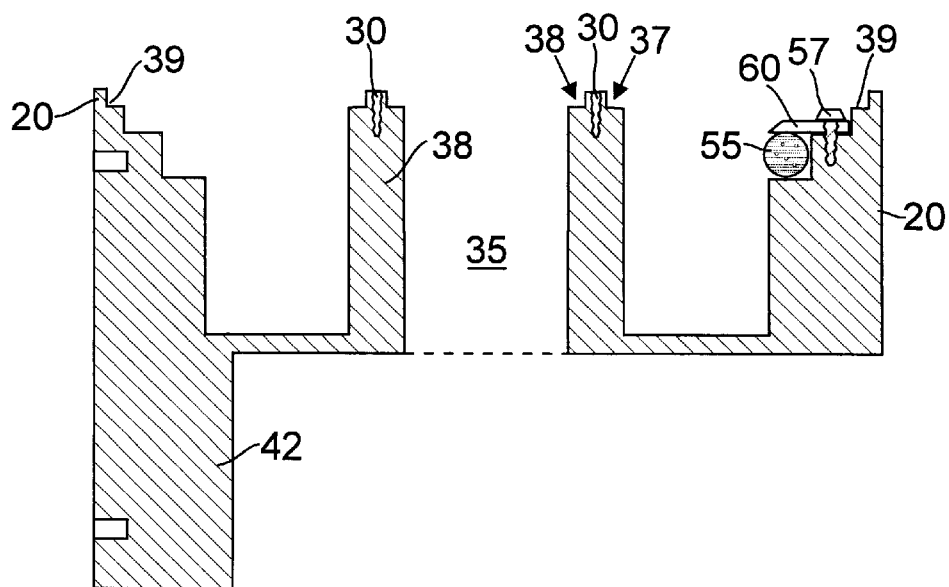
FIG. 3 is a cross-sectional view of the illuminator along line 3—3 of FIG. 2B.
Figure 4:
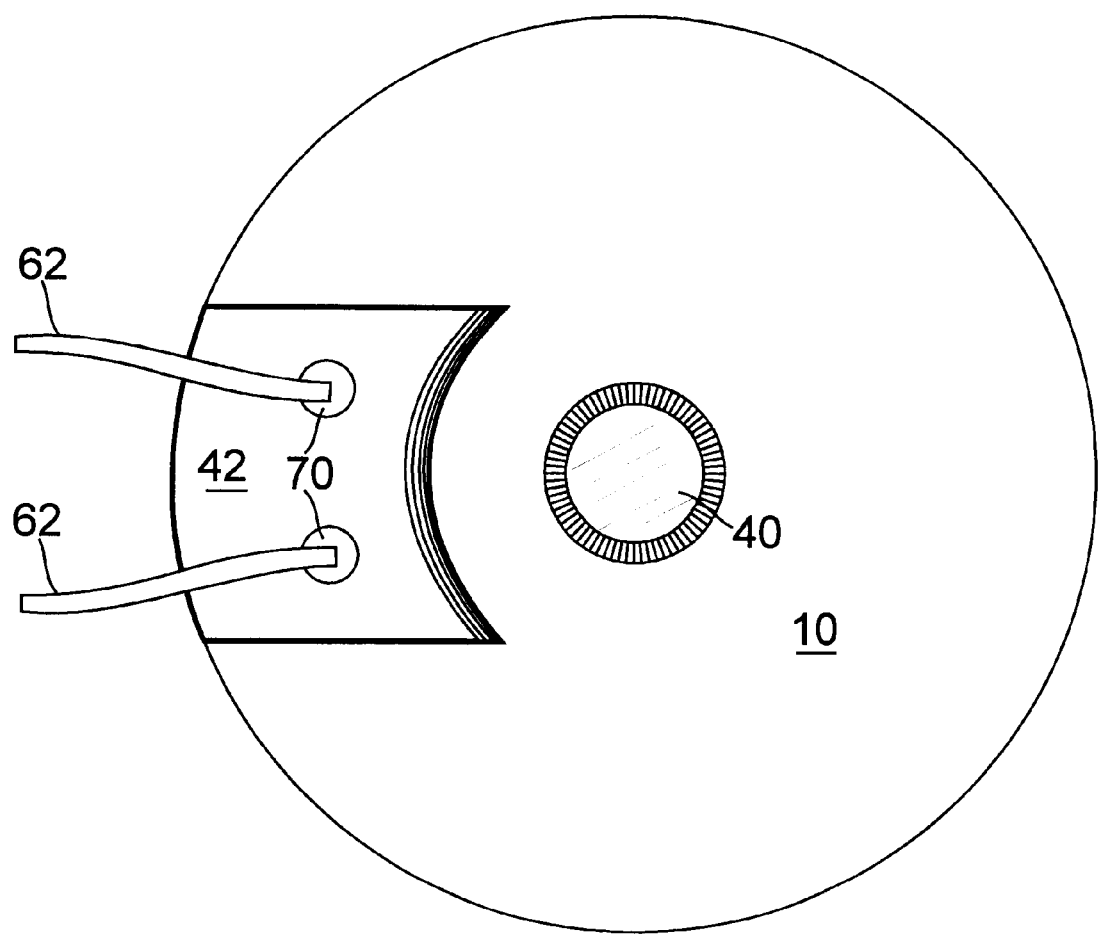
FIG. 4 is a rear view of the illuminator with the strobe mount removed.
Figure 8A:
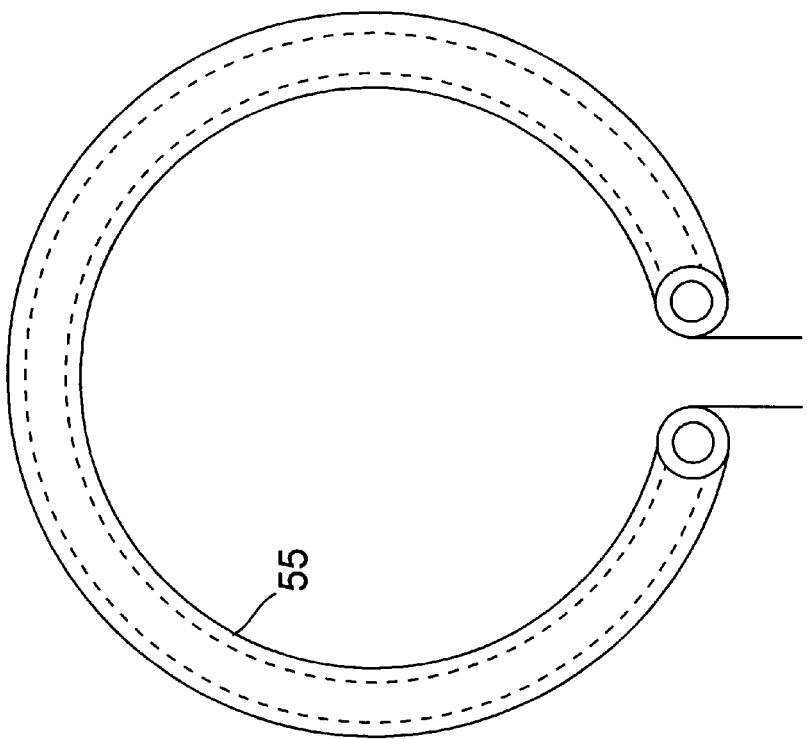
FIG. 8A is a front view of the ring-shaped strobe lamp used in the illuminator.
Figure 8B:
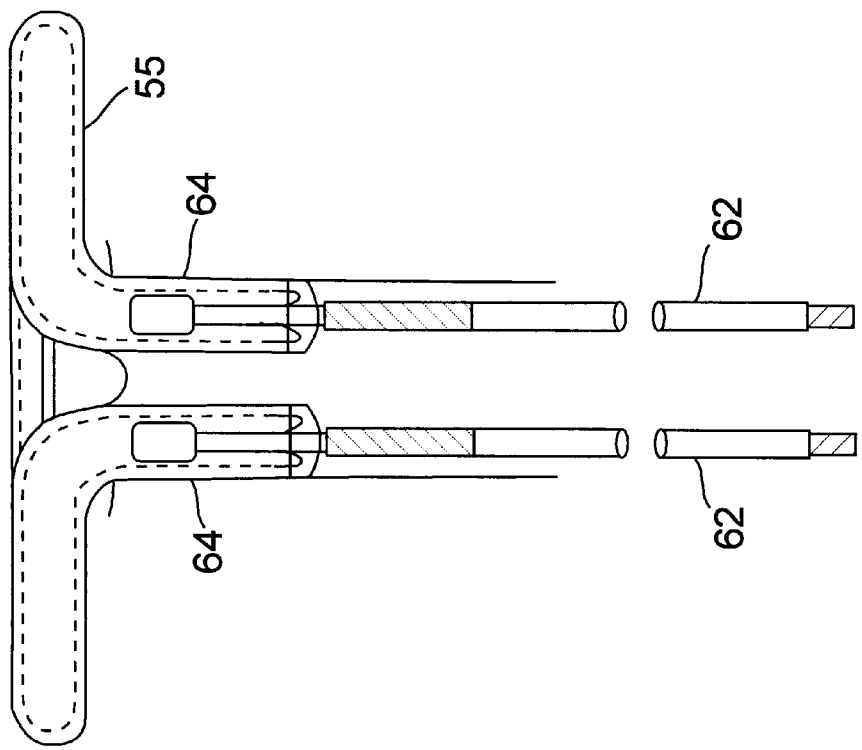
FIG. 8B is a side view of the strobe lamp.

Referring to FIGS. 1–3, a strobe illuminator 5 of the present invention, is shown. Strobe illuminator 5 includes a strobe housing 10 which has an outer ring 20 and an interior cavity or chamber 22. As illustrated in FIG. 4, most of the rear of housing 10 is enclosed. At the center of the rear of housing 10 is an opening 40 which opens into a cylindrical passageway 35 extending from the rear to the front of the illuminator and forming the inner wall of chamber 22. Housing 10 and passageway 35 may be molded as a single piece with the outer ring 20 from a material such as Delrin. The lens of a camera or CCD device 50 (FIG. 1) may be rested on stand 42 and positioned over an opening 40 at the rear of passageway 35.

Two circular-shaped filters, blue bandpass filter 24 and ultraviolet (UV) bandpass filter 26, shown individually in FIGS. 5A–B and 6A–B, respectively, are secured to the front of the illuminator with retaining ring 28 (FIGS. 7A–7B). The center of UV filter 26 has a circular cutout 43 which fits around the exterior of passageway 35.

FIG. 2A shows the front of illuminator 5 as assembled. FIG. 2B shows the front of illuminator 5 with filters 24 and 26 and retaining ring 28 removed.

FIG. 3 shows a cross-section of illuminator 5 along line 3—3 of FIG. 2B. At the front of passageway 35, the innermost and outermost circumferences of wall 36 are slightly recessed at recesses 37, 38, forming seats for filters 24 and 26. The recesses 37, 38 are approximately as deep as the thickness of the respective filter. The inner circumference of outer ring 20 is also recessed at recess 39 approximately as deep as the width of the UV filter 36. Blue filter 24 sits in the inner recess 38 over the front end of passageway 35. The outer diameter of UV filter 26 sits in recess 39 and the inner diameter sits in recess 37. As mentioned above, both filters are held in place with retaining ring 28. Retaining ring 28 is mounted with four evenly-spaced screws 30 which screw into holes 32. Any conventional structure for securing the filters may be used, including retaining clips, adhesives and the like.

One suitable blue filter 24 is made by Hoya Optics part no. B-460. This filter transmits light with a wavelength in approximately the 430–470 nm range and is annular having a 0.850" O.D. and a 0.10" thickness. However, any filter which filters light in this range is also suitable.

Figure 11:
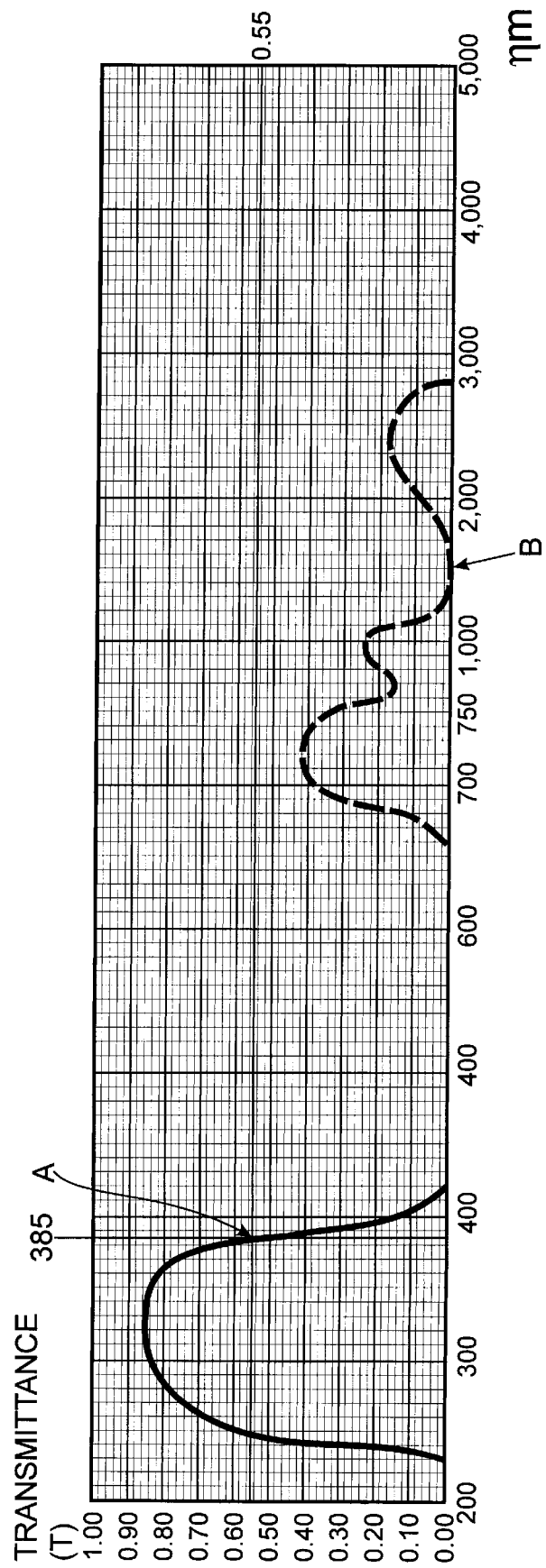
FIG. 11 is a graph representative of the transmittance of light generated by the strobe lamp as a function of the bandwidths of light which pass through the ultraviolet filter.

UV filter 26 transmits light in the ultraviolet (UV) range of approximately 230–430 nm range, while blocking the transmission (absorbing) of substantially all nonultraviolet light outside this range. In the preferred embodiment, shown by curve A in FIG. 11, UV filter 26 is efficient, having a peak transmittance of 85–90%. One suitable UV filter 26, transmitting light in the desired range, is Hoya Optics part no. U-360 having a 3.81" O.D. and 1.25" I.D. and a 0.01" thickness. The UV filter 26 from Hoya Optics permits some infrared light to pass, as shown by curve B (FIG. 11), but this infrared light does not interfere with the operation of the illuminator.

Should a particular UV filter 26 not have a transmittance as high as shown by curve A, the wattage of strobe lamp 55, discussed below, may be increased, although this would reduce the efficiency of the illuminator.

At the bottom rear of housing 10 is a stand 42 molded as part of housing 10. The top of stand 42 is shaped to permit the lens of a camera or CCD device 50 to be rested thereon, and typically will be arcuate-shaped. (FIGS. 3 and 4) The bottom of stand 42 preferably conforms to the perimeter of the outer ring 20. (FIG. 9)

Housing 10 sits on strobe mount 44, the top of which is also shaped for mounting the housing 10 including stand 42 thereon and is preferably arcuate-shaped. (FIGS. 1 and 9) Strobe mount 44 is attached to housing 10 with two screws 46 (one under outer ring 20 and the other under stand 42). As illustrated in FIG. 10B, two threaded holes 48 through strobe mount 44 permit the illuminator 5 with strobe mount 44 to be mounted on a stand (not shown).

A ring-shaped strobe flash lamp 55 which surrounds passageway 35 (FIGS. 2B, 3, 8A–8B) is held in place within chamber 22 with retaining clip 60 which is screwed into housing 10 at 57. A preferred ring-shaped lamp is manufactured by EG&G Optoelectronics Part No.: 302-3001 (also referred to as Model MVS 3001). This is a 60 W lamp which emits light in a bandwidth of 300—1100+ nm. The lamp is preferably powered at 600–1000 V. It can be ordered in a variety of diameters, with the 2.5" diameter being preferred to keep the illuminator compact for use in a wide variety of applications. The strobe pulse duration required to trigger the strobe to flash is adjustable from 10 to 100 microseconds. The desired duration of the strobe flash once it is triggered is approximately 40 microseconds.

The two terminals 64 of lamp 55 curve away at a 90 degree angle from the ring-shaped portion of the lamp. (FIG. 8B) Lamp 55 is inserted into housing 10 with terminals 64 toward the bottom of the housing and extending into stand 42. High voltage power leads 62 (FIG. 9) extending out through two holes 70 on the rear of stand 42 (FIG. 4) connect lamp 55 via connectors 63 to a high voltage strobe power supply (not shown) external to the illuminator. One set of appropriate power leads and connectors 63 are shipped by EG&G Optoelectronics along with ring-shaped lamp 55.

Working in conjunction with illuminator 5 is a sensor 64 (FIG. 1) which is mounted near the illuminator. Sensor 64 senses when an object is passing in proximity to the illuminator 5. A suitable proximity sensor may be a Keyence reflective sensor Model PZ2-62.

The operation of the illuminator 5 in an application for reading a matrix code 80 imprinted in blue-colored ultraviolet ink on a surface 82 is now described. Camera 50, illuminator 5 and the proximity sensor 64 are connected to a controller (not shown) which does not form a part of this invention and is therefore not described in great detail. The controller functions to receive a signal from the sensor 64 when an object passes in front of the sensor. This signal in turn triggers the controller to operate simultaneously to activate the strobe lamp 55 to flash once for approximately 40 microseconds, and to cause camera 50 to record an image. The UV light 100 from the strobe lamp 55 passes through UV filter 26 and impinges upon the blue-colored UV material on surface 82, of which matrix code 80 is comprised, causing the UV material to fluoresce. The emitted light 110 is the same color as the ink, viz. blue. The UV light may also impinge upon other nearby materials, whether a surface 82 or otherwise, which fluoresce in response to UV light. Thus, non-blue light may be emitted from the substrate 82 as well.

The emitted light 110, is reflected onto the illuminator 5, where ambient non-blue light is filtered out by blue filter 24 filtering in the 350–550 nm range, and the filtered light is captured by camera 50 for processing.

As an example, if the ultraviolet ink was printed for identification purposes on a test tube with an orange stopper, the blue filter would filter out any orange light which may be emitted due to some possible fluorescence of the orange material.

Although blue ink is currently the most common color of UV material, one could select to print a matrix code in an ultraviolet ink of a different color. For proper operation, a filter having a color corresponding to the color of the ultraviolet ink must then be substituted as filter 24, in place of a blue filter, to filter out extraneous wavelengths.

One satisfactory UV material which may be used in conjunction with the present invention is the Domino ink type CL1410 which absorbs light at approximately 385 nm (the Hoya Optics U-360 UV filter has a transmittance of approximately 55% at this wavelength) and, in response, reflects back light at 430–470 nm. Another satisfactory ultraviolet ink is made by Videojet.

The illuminator must be located within a maximum distance from the matrix code to illuminate the code and record the fluorescent light reflected onto the illuminator. The maximum distance depends on the intensity of the ultraviolet light and the fluorescence of the material, and thus will likely be different in different applications and designs. To insure that the UV light is intense enough to cause the UV material to fluoresce, generally, it is preferable to leave no more than six inches between the illuminator and the UV material. However, a sufficiently fluorescent material may be excited by the lamp 60 at a farther distance.

Although the above description refers to the side of the illuminator to which the filters are secured as the "front" as a means of reference, the illuminator may typically be used with the filters facing upward and the camera positioned underneath the illuminator.

One skilled in the art will recognize that numerous modifications and variations can be made to the illuminator without departing from the scope and spirit of the invention. For example, although the UV filter 26 is circular in the preferred embodiment because it is easier to cut a circular filter, the UV filter 26 may be shaped differently. One alternative is to use a square UV filter. A further alternative is to use a square UV filter and to substitute a ring strobe light with a non ring strobe bulb and/or multiple strobe bulbs. Such an arrangement may permit the illuminator to be more compact. As another example, although unnecessary for the structure described above, vent holes may be made in the outer ring of the housing or a small fan can be placed inside the housing for cooling. In either case, the goal is to provide uniformly sufficient illumination over the code to be read.

I claim:

1. An apparatus for illuminating an ultraviolet material with ultraviolet light comprising:

a housing having an interior chamber, an interior wall on one side of the interior chamber, a first side of the chamber facing the ultraviolet material, a second side of the chamber opposite the first side, a first opening and a second opening in the first side, and a third opening in the second side, a passageway having a perimeter surrounded by an outer wall, the passageway extending substantially from the second opening to the third opening, the passageway perimeter defining the interior wall of said chamber, a strobe lamp disposed within said chamber having an ultraviolet light output wherein the passageway perimeter prevents the ultraviolet light generated by said strobe lamp from passing into said passageway, and an ultraviolet bandpass filter covering said first opening of said chamber, but not said passageway, to block substantially all nonultraviolet light generated by said strobe lamp.

2. The apparatus of claim 1 wherein said ultraviolet material is a first color and said apparatus further comprises a second filter of said first color covering said second opening.

3. The apparatus of claim 2 wherein the ultraviolet material is on a substrate and further comprising a proximity sensor having an output corresponding to said substrate moving into proximity of said proximity sensor and means for causing said strobe lamp to flash in response to said sensor output.

4. The apparatus of claim 3 wherein the causing means operates to cause the strobe lamp to flash once in response to a sensor output.

5. The apparatus of claim 2 wherein said ultraviolet material is blue and said second filter further comprises a bandpass filter passing light between the wavelengths of 350–550 nm.

6. The apparatus of claim 5 wherein said strobe lamp is ring-shaped and surrounds said passageway.

7. The apparatus of claim 6 wherein said passageway is cylindrical.

8. The apparatus of claim 1 wherein said ultraviolet material comprises an ink or resin formed as an optically readable code.

9. The apparatus of claim 1 further comprising a stand on which an image sensing means is rested opposite said third opening.

10. The apparatus of claim 9 wherein said image sensing means is a camera.

11. The apparatus of claim 9 wherein said image sensing means is a CCD device.

12. The apparatus of claim 1 wherein said ultraviolet bandpass filter transmits light in the range of 230–430 nm.

13. A method of reading an optically readable code imprinted on a surface in ultraviolet material comprising a first color, said method comprising:

providing an illuminator apparatus comprising: a strobe lamp; a housing having a light emitting end and a cavity; a passageway disposed in said housing optically isolated from said strobe lamp; said strobe lamp having an ultraviolet light output, and an ultraviolet bandpass filter positioned to block substantially all nonultraviolet light generated by said strobe lamp from impinging upon said optically readable code;

placing a sensor near said illuminator apparatus and means for reading an image behind said illuminator apparatus;

moving an optically readable code first in frontof said sensor to activate said sensor and then moving said code in front of said illuminator apparatus;

illuminating the strobe lamp in response to the activation of said sensor, said ultraviolet filter permitting only ultraviolet light to pass through onto said optically readable code, thereby causing said ultraviolet material of said optically readable code to fluoresce and emit light substantially of said first color comprising a first band of wavelengths; and reading said optically readable code with said reading means.

14. The method of claim 13 wherein providing said illuminator apparatus further comprises providing a housing having an interior chamber, an interior wall on one side of the interior chamber, a first side of said chamber facing said ultraviolet material, a second side of said chamber opposite said first side, a first opening and a second opening in said first side, and a third opening in said second side, a passageway having a perimeter surrounded by an outer wall, the passageway extending substantially from the second opening to the third opening, the passageway perimeter defining the interior wall of said chamber and preventing the ultraviolet light generated by said strobe lamp from passing into said passageway, and covering said second opening with a second bandpass filter of said first color, and said method further comprises using said second filter to filter out ambient light and permit only light of said first color to enter said passageway.

15. The method of claim 14 wherein placing the reading means further comprises providing a camera and placing said camera behind said third opening.

16. The method of claim 14 wherein placing the reading means further comprises providing a CCD device and placing said CCD device behind said third opening.

17. Apparatus for illuminating an ultraviolet optically readable symbol comprising:

a housing having a light emitting end and a cavity;

a strobe light disposed in said housing cavity having an ultraviolet radiation output;

a passageway disposed in said housing optically isolated from said strobe light; and a first bandpass filter coupled to said housing so that the strobe light ultraviolet radiation output passes through said first filter and does not pass into said passageway, the first filter having a bandpass frequency range in the ultraviolet range.

18. The apparatus of claim 17 wherein said ultraviolet material is a first color and said apparatus further comprises a second filter of said first color covering said second opening.

19. The apparatus of claim 18 wherein the ultraviolet material is on a substrate and further comprising a proximity sensor having an output corresponding to said substrate moving into proximity of said proximity sensor and means for causing said strobe lamp to flash in response to said sensor output.

20. The apparatus of claim 19 wherein the causing means operates to cause the strobe lamp to flash once in response to a sensor output.

21. The apparatus of claim 18 wherein said ultraviolet material is blue and said second filter further comprises a bandpass filter passing light between the wavelengths of 350–550 nm.

22. The apparatus of claim 21 wherein said strobe lamp is ring-shaped and surrounds said passageway.

23. The apparatus of claim 22 wherein said passageway is cylindrical.

24. The apparatus of claim 17 wherein said ultraviolet material comprises an ink or resin formed as an optically readable code.

25. The apparatus of claim 17 further comprising a stand on which an image sensing means is rested opposite said third opening.

26. The apparatus of claim 25 wherein said image sensing means is a camera.

27. The apparatus of claim 25 wherein said image sensing means is a CCD device.

28. The apparatus of claim 17 wherein said first bandpass filter transmits light in the 230–430 nm range.

\* \* \* \* \*